(12) United States Patent
Martin

(10) Patent No.: US 10,407,997 B2
(45) Date of Patent: Sep. 10, 2019

(54) THREADED CONNECTION

(71) Applicants: VALLOUREC OIL AND GAS FRANCE, Aulnoye-Aymeries (FR); NIPPON STEEL & SUMITOMO METAL CORPORATION, Chiyoda-ku (JP)

(72) Inventor: Pierre Martin, Marly (FR)

(73) Assignees: VALLOUREC OIL AND GAS FRANCE, Aulnoye-Aymeries (FR); NIPPON STEEL CORPORATION, Chiyoda-ku (JP)

( * ) Notice: Subject to any disclaimer, the term of this patent is extended or adjusted under 35 U.S.C. 154(b) by 279 days.

(21) Appl. No.: 15/525,185

(22) PCT Filed: Dec. 16, 2015

(86) PCT No.: PCT/EP2015/080088
§ 371 (c)(1),
(2) Date: May 8, 2017

(87) PCT Pub. No.: WO2016/097049
PCT Pub. Date: Jun. 23, 2016

(65) Prior Publication Data
US 2018/0283109 A1    Oct. 4, 2018

(30) Foreign Application Priority Data
Dec. 19, 2014    (FR) .................................... 14 63007

(51) Int. Cl.
*F16L 15/06*    (2006.01)
*E21B 17/042*    (2006.01)

(52) U.S. Cl.
CPC .......... *E21B 17/0423* (2013.01); *F16L 15/06* (2013.01)

(58) Field of Classification Search
CPC ....... F16L 15/002; F16L 15/004; F16L 15/06; F16L 15/04
(Continued)

(56) References Cited

U.S. PATENT DOCUMENTS 4,688,832 A * 8/1987 Ortloff ................ E21B 17/0423
285/148.19
6,174,001 B1 * 1/2001 Enderle ............... E21B 17/0423
285/334
(Continued)

FOREIGN PATENT DOCUMENTS

CN    102639911 A    8/2012
CN    102947635 A    2/2013
(Continued)

OTHER PUBLICATIONS

International Search Report dated Feb. 17, 2016 in PCT/EP2015/080088 filed Dec. 16, 2015.

*Primary Examiner* — Aaron M Dunwoody
(74) *Attorney, Agent, or Firm* — Oblon, McClelland, Maier & Neustadt, L.L.P.

(57) ABSTRACT

A threaded tubular connection includes male and female threaded elements. The male threaded element includes outer and inner male threadings, a first outer peripheral surface disposed between the male threadings, a first male sealing surface on the outer peripheral surface, a second outer peripheral surface, a male axial abutment surface disposed at the end of the male threaded element, and a second male sealing surface provided on the second outer peripheral surface between the inner threading and the male axial abutment surface. The female threaded element includes outer and inner female threadings, an inner peripheral surface disposed between the female threadings, at least one first female sealing surface on the inner peripheral surface, a female axial abutment surface, and a second
(Continued)

female sealing surface provided between the female axial abutment surface and the inner female threading. Threads of the male and female outer threadings are engaged in a coupled state.

17 Claims, 5 Drawing Sheets

(58) Field of Classification Search
USPC .............................. 285/390, 333, 334, 391
See application file for complete search history.

(56) References Cited

U.S. PATENT DOCUMENTS

| | | | | |
|---|---|---|---|---|
| 6,481,760 | B1* | 11/2002 | Noel | E21B 17/042 285/333 |
| 6,543,816 | B1 | 4/2003 | Noel | |
| 2004/0017081 | A1* | 1/2004 | Simpson | E21B 17/042 285/333 |
| 2004/0195835 | A1* | 10/2004 | Noel | F16L 15/001 285/333 |
| 2006/0145480 | A1* | 7/2006 | Mallis | E21B 17/0423 285/390 |
| 2006/0152000 | A1* | 7/2006 | DeLange | E21B 17/042 285/334 |
| 2009/0058085 | A1* | 3/2009 | Breihan | F16L 15/002 285/334 |
| 2011/0278838 | A1 | 11/2011 | Martin et al. | |
| 2013/0069364 | A1* | 3/2013 | Martin | F16L 15/004 285/333 |
| 2014/0084582 | A1* | 3/2014 | Elder | E21B 17/0423 285/334 |
| 2015/0240570 | A1* | 8/2015 | Oku | E21B 17/0423 285/334 |
| 2016/0115742 | A1* | 4/2016 | Martin | F16L 15/002 285/391 |

FOREIGN PATENT DOCUMENTS

| | | |
|---|---|---|
| CN | 103140645 A | 6/2013 |
| CN | 203905839 U | 10/2014 |
| FR | 2 939 861 A1 | 6/2010 |
| WO | WO 2011/060894 | 5/2011 |

* cited by examiner

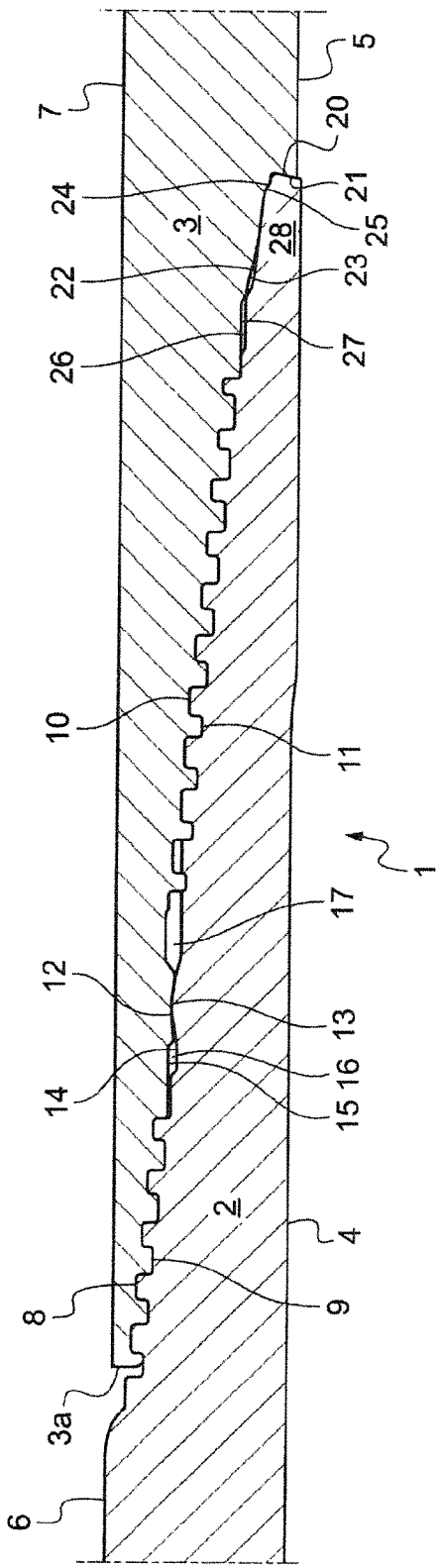
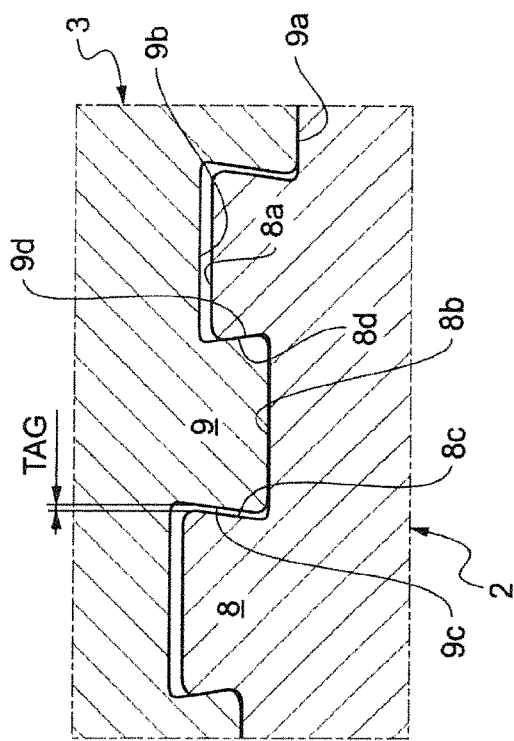

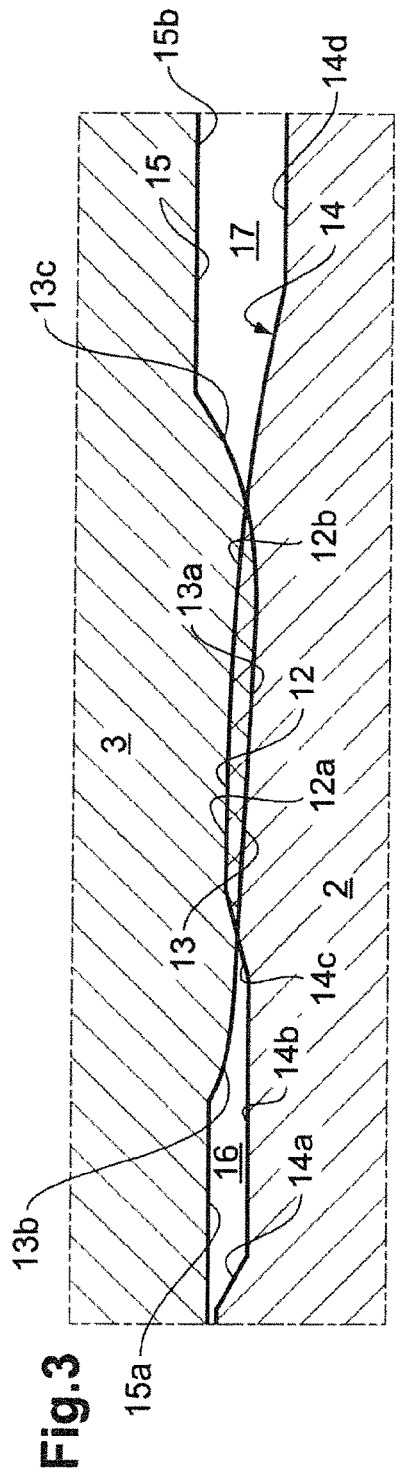
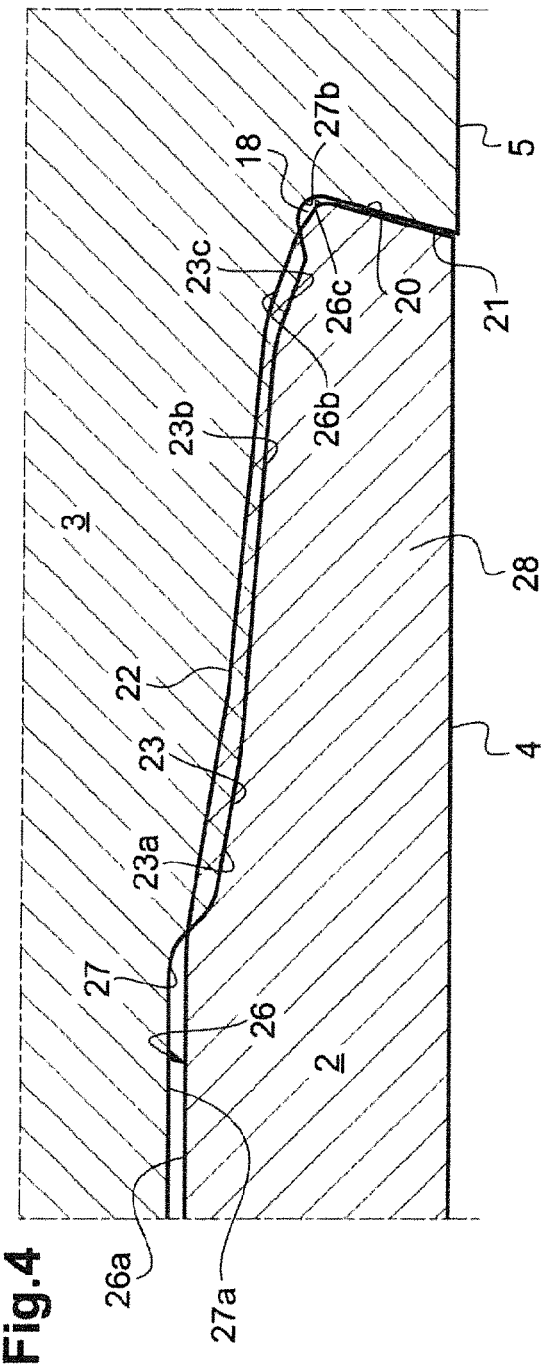
Fig.3
Fig.4

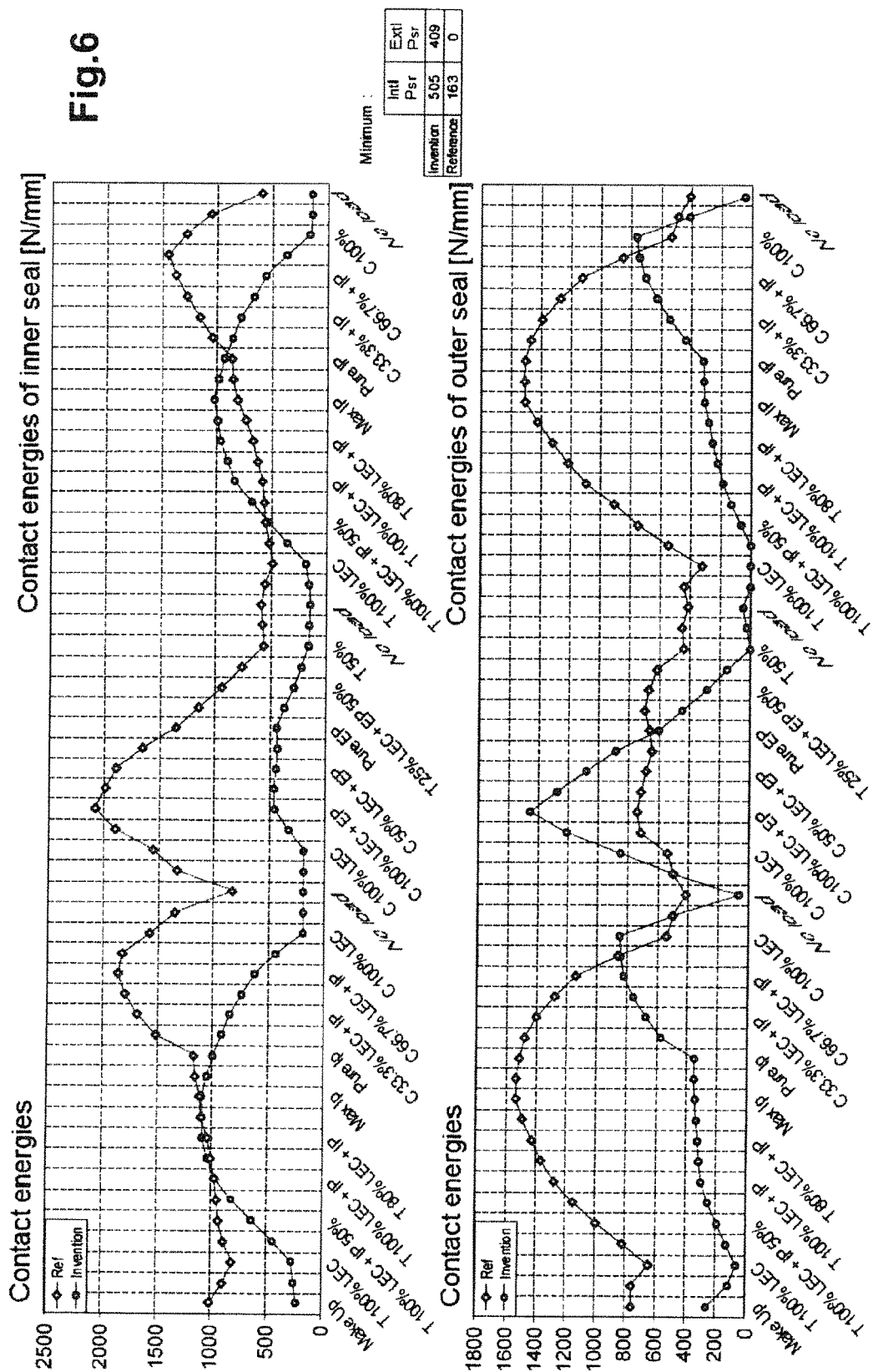

THREADED CONNECTION

TITLE OF THE INVENTION

BACKGROUND OF THE INVENTION

The invention relates to the field of sealed connections of threaded tubular components used in particular for drilling or operating hydrocarbon wells. When drilling or operating, the connections are subjected to large compressive and tensile loads and they must be prevented from coming apart. The connections are subjected to axial tension or compression, internal or external fluid pressure, bending or twisting, which may be combined, and of an intensity which can fluctuate. The seal has to be guaranteed despite the loads and despite the harsh conditions of use on site. The threaded connections are susceptible of being made up and broken out several times without degrading their performance, especially by galling. After break-out, the tubular components can be reused under other service conditions.

Under tension, a phenomenon of jump-out may occur and propagate from one thread to another, with the risk of the connection coming apart. This phenomenon is facilitated by a high internal pressure.

The Applicant has observed that this phenomenon can also be favoured by a high external pressure. Application WO 01/29476 proposes a threaded connection with a tapered threading, the male and female threadings respectively comprising a single threaded zone with a central sealing surface disposed in a central zone of the threaded zone. An abutment is provided at the free end of the male element. Other sealing surfaces are provided in the vicinity of the abutment. That connection has been highly satisfactory for many years.

A need has now arisen for a leap in the performance of a connection, in particular under combined tension and external pressure after strong compression, as well as in terms of the efficiency of the connection. The efficiency is generally defined as being the ratio of the critical section of the connection over the section of a regular portion of a tube between the two ends of a component. The critical section of the connection is equal to the minimum of the critical section of the male element and the critical section of the female element.

BRIEF SUMMARY OF THE INVENTION

The invention proposes a connection with improved behaviour over all of these aspects.

A threaded tubular connection comprises a male threaded element disposed at the end of a first tubular component and a female threaded element disposed at the end of a second tubular component.

The male threaded element comprises two male threadings, an outer and an inner, a first outer peripheral surface disposed between the male threadings, a first male sealing surface on said outer peripheral surface, a second outer peripheral surface, a male axial abutment surface disposed at the end of the male threaded element, and a second male sealing surface provided on the second outer peripheral surface of the male threaded element between the inner threading and the male axial abutment surface.

The female threaded element comprises two female threadings, an outer and an inner, an inner peripheral surface disposed between the female threadings, at least one first female sealing surface on said inner peripheral surface, a female axial abutment surface, and a second female sealing surface provided between the female axial abutment surface and the female threadings, the threads of said male and female outer threadings being engaged in the coupled state, the threads of said male and female inner threadings being engaged in the coupled state.

The male axial abutment surface and the female axial abutment surface are abutted in the coupled state. The first male sealing surface and the first female sealing surface are in sealing contact in the coupled state. The second male sealing surface and the second female sealing surface are in sealing contact in the coupled state.

The outer male threading comprises a dovetail thread with an increasing width and the corresponding outer female threading comprises a dovetail thread with an increasing width, the thread of said outer male threading comprising a load flank and a stabbing flank, the stabbing flank being contact-free in the coupled state, the thread of said inner male threading comprising a load flank and a stabbing flank, said stabbing flank being contact-free in the coupled state. The thickness of the female element measured in a radial plane intersecting with the first female sealing surface is in the range 20% to 50% of the nominal thickness of the male threaded element.

Because of the invention, the connection performs very well as regards external pressure, the central seal disposed between the outer and inner threadings preventing propagation of the pressure towards the interior and any deformation of the seal located on the inner side of the connection. The threads of the outer threadings provide excellent stability both in tension and in compression, allowing for optimum function of the central seal. Further, the distance selected between the seals, one central and the other inner, which distance is substantially smaller than the total length of the threadings, means that in the case of compression, displacement of the male central seal with respect to the female central seal can be reduced and as a consequence, mutual cooperation is kept within their optimum zone. Further, the distance between the seals is expressed along a radial axis as the radial thickness of the material has a predominant effect on the sealing behaviour. If the gradients of the two threadings, outer and inner, are equal, then the axial distance between the seals is also representative, but indirectly.

The two male threadings, inner and outer, of the male threaded element may have two distinct generatrices with the same gradient in a first variation, two generatrices with different gradients in a second variation, and a common generatrix in a third variation. The term "outer threading" and "inner threading" means threadings respectively with a large diameter and small diameter. A sealing surface is a zone which is machined so as to interfere diametrically with a corresponding zone of the other threaded element, the interference being sufficient, within the inevitable machining tolerances, to ensure a seal under the normal conditions of use in the coupled state. The sealing surfaces may be metal/metal. The male threaded element and the female threaded element may be produced from steel. The sealing surfaces may be produced from steel.

Further, the thread of the outer female threading comprises a load flank and a stabbing flank, said load flank being contact-free in the coupled state. The thread of the inner female threading comprises a load flank and a stabbing flank, said load flank being contact-free in the coupled state. The screwing torque is kept low.

In one embodiment, the inner male threading comprises a thread with an increasing width and the corresponding inner female threading comprises a thread with an increasing width. The width of the thread of the inner male threading increases towards the first male sealing surface. The width of the inner female threading increases in the opposition direction to the first female sealing surface. The thread of the male outer threading has an increasing width on moving in the direction opposite to the first male sealing surface. The thread of the outer female threading has an increasing width on moving towards the first female sealing surface. The mechanical behaviour of the connection is improved.

In one embodiment, the inner male threading comprises a dovetail thread with an increasing width and the corresponding inner female threading comprises a dovetail thread with an increasing width. The risk of jump-out is reduced.

In one embodiment, the connection comprises a single male axial abutment surface and a single female axial abutment surface. Said axial abutment surfaces may be annular. The female axial abutment surface may be disposed in the vicinity of a bore of the female threaded element. In other words, said male and female abutment surfaces are disposed in a zone with a small diameter, in particular with respect to the first sealing surface. The male axial abutment surface may be disposed at the end of a lip located in the extension of the male inner threading. On its outer surface, the lip has a location for the second male sealing surface. This results in good connection efficiency and excellent internal pressure resistance. The positioning of the sealing surfaces is accurate.

In one embodiment, in the coupled state, the outer male threading exhibits radial interference at the thread root with the corresponding female threading and a radial clearance at the thread crest.

In another embodiment, in the coupled state, the outer male threading exhibits radial interference at the thread crest with the corresponding female threading and a radial clearance at the thread root.

In one embodiment, in the coupled state, the inner male threading exhibits radial interference at the thread root with the corresponding female threading and a radial clearance at the thread crest.

In another embodiment, in the coupled state, the inner male threading exhibits radial interference at the thread crest with the corresponding female threading and a radial clearance at the thread root.

In the above four embodiments, the radial clearance is preferably in the range 0.05 to 0.500 mm, more preferably in the range 0.05 to 0.400 mm. The screwing torque is well under control.

In one embodiment, said stabbing flank which is contact-free in the coupled state has an axial clearance in the range 0.002 to 1.000 mm, preferably 0.002 to 0.400 mm, with the corresponding stabbing flank. This thereby avoids contact between the stabbing flanks, and hence reduces the risk of a spike in the screwing torque.

In one embodiment, the screwing torque placing said connection in the coupled state and ready for use is less than 94907 Nm, preferably 67725.5 Nm, corresponding to 70000 foot pounds, preferably 50000 foot pounds in the imperial system.

In one embodiment, the outer male threading is vanishing at the large diameter end. The efficiency of the connection is high.

In one embodiment, the inner male threading is vanishing at the large diameter end. The efficiency of the connection is high.

In one embodiment, the outer male threading comprises a load flank with an inclination in the range −1 to −15°, preferably −5 to −8°, with respect to a radial plane. The absolute value of at least 1° means that the benefit of radial cohesion is gained.

In one embodiment, the outer male threading comprises a stabbing flank with an inclination in the range +1 to +15°, preferably +5 to +8°, with respect to a radial plane. The absolute value of at least 1° means that the benefit of radial cohesion is gained.

In one embodiment, the male axial abutment surface is at an angle in the range 0 to 30° with respect to a radial plane.

In one embodiment, the first tubular component has a nominal external diameter of more than 230 mm.

In one embodiment, the female threaded element has an external diameter of less than 110%, preferably 103%, of the external diameter of the second tubular component.

In one embodiment, the threadings have a taper in the range 5% to 20%. Screwing-up is rapid.

In one embodiment, the male threaded element comprises a lip with a thickness in the range 15% to 40%, preferably in the range 20% to 35%, of the normal thickness of the male threaded element. This range means that the generatrix can be provided with a high gradient and high connection efficiency can be obtained. The lip is disposed between the inner threading and the male axial abutment surface. The lip carries the second male sealing surface.

In one embodiment, the connection has an efficiency of more than 80%, preferably more than 85% for "semi-flush" connections, i.e. a connection with an external diameter 1.5% to 5% higher than the nominal diameter of the tube.

In one embodiment, the connection has an efficiency of more than 60%, preferably more than 65% for "flush" connections, i.e. a connection with an external diameter equal to the nominal diameter of the tube, allowing for tolerances.

In one embodiment, the connection forms part of a casing string.

In one embodiment, the male threading has a pitch in the range 5 to 20 mm. The pitch may be equal to 8.466 mm.

In one embodiment, the first tubular component is provided with two male threaded elements and the second tubular component is provided with two female threaded elements.

In another embodiment, the first tubular component comprises said male threaded element and a female threaded element disposed at the other end.

BRIEF DESCRIPTION OF THE SEVERAL VIEWS OF THE DRAWINGS

The present invention will be better understood from the following detailed description of an embodiment which is by way of non-limiting example and illustrated in the accompanying drawings in which:

FIG. 1 is a diagrammatic illustration in a longitudinal sectional view of a threaded connection in accordance with one aspect of the invention;

FIG. 2 is a detailed view of FIG. 1, showing the threadings;

FIG. 3 is a detailed view of the first seal;

FIG. 4 is a detailed view of the second seal during screwing;

FIG. 6 is a diagram showing the contact surfaces up the ordinate as the loads along the abscissa to which the connection is subjected are changed, for the connection of the invention and for a comparative connection, on the first and second sealing surfaces;

DETAILED DESCRIPTION OF THE INVENTION

Figure 5:
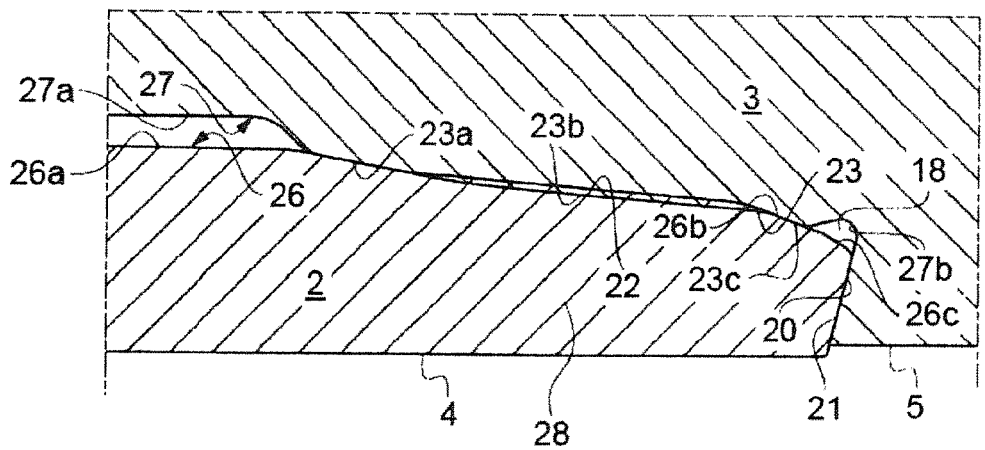
FIG. 5 is a detailed view of the second seal in the coupled state.

The accompanying drawings not only serve to elucidate the invention, but also contribute to its definition if necessary.

In order to improve connections, the Applicant has developed high quality connections known as premium connections which exceed API standards. Sealing surfaces may be provided in the vicinity of the threaded zones, said surfaces being brought into interfering contact during screwing of the components.

The threaded zones are provided at the end of each of the male and female tubular components. The female tubular component may be a great length tube or, in contrast, a short coupling type tube. A fluid (liquid or gas) seal under high pressure necessitates, for a given threaded connection, bringing sealing surfaces or areas into mutually radially interfering contact. The intensity of the radial interference fit is a function of the relative axial position of the male and female threaded zones, said relative position being determined by bringing abutment surfaces respectively provided on the male and female ends into contact. The relative positioning results from bringing the abutments into contact. Abutment surfaces are provided on the inner side of the connection. The abutment surfaces are in the vicinity of the bore. The male end comprises, on its outer periphery, a threaded zone extended by the sealing surface itself extended by a terminal portion ending in an abutment surface. The female end comprises, on its inner periphery, a threaded zone extended by a sealing surface.

The Applicant is particularly interested in large diameter threaded connections, in particular for casing. Connections of this type are sometimes subjected to intense tensile and compressive loads. High performance of the connection under tension and compression is thus desirable. In fact, when the tensile force is excessive, a disengaging phenomenon causes the threads to come away from each other, which causes the two components of the connection to separate. The consequences may be particularly undesirable from the technical point of view and from the point of view of cost. This is particularly the case when the threading has a tapered generatrix—jump-out of one thread can cause the connection to come apart completely.

Further, the Applicant has observed that the screwing torque necessary to bring the connection into service, i.e. to put it in a ready for use coupled state, increases with the nominal diameter of the tubular component. However, screwing machines with a very high torque are relatively rare globally, both because they are heavy and expensive to use and transport, and take time to obtain. For large diameter components, obtaining a low screwing and makeup torque means that they can be made up with screwing machines which are in far more general use and widely available. There is a great need for improvement as regards controlling the screwing torque, the internal pressure behaviour and the external pressure under tension and compression.

As can be seen in FIG. 1, a threaded tubular connection 1 comprises a male threaded element 2 and a female threaded element 3. The male threaded element 2 and/or the female threaded element 3 may belong to a tube several meters in length, for example of the order of 10 to 15 m in length. One of its ends, generally the female threaded element, may constitute the end of a coupling, in other words a short length tube which can be used to connect two great length tubes each provided with two male ends (a threaded and coupled, T&C, connection). A coupling may be provided with two female ends. In a variation, a great length tube may be provided with a male end and a female end to form a connection by means of an integral threaded connection. The connection 1 is of the mass-produced type.

The connection 1 may be used to constitute casing strings for hydrocarbon wells. The connection 1 is ready for use once the male threaded element and female threaded element have been connected with application of the envisaged screwing torque.

The tubes may be produced in different types of non-alloy steel, low alloy steel or high alloy steel, or even in a ferrous or non-ferrous alloy, heat treated or work hardened, depending on the service conditions, examples of which are: the level of mechanical loading, the corrosive nature of the fluid inside or outside the tube, etc. It is also possible to use steel tubes which are less corrosion-resistant, coated with a protective coating, for example formed from a corrosion-resistant alloy or synthetic materials.

The term "screwing" means the operation of relative rotation and translation of one component with respect to the other with mutual engagement of the threaded zones. The term "makeup" means an operation following screwing, continuing the relative rotation and translation, resulting in a given clamping torque between the two components. The angle of the flanks is taken in the clockwise direction with respect to a radial plane passing through the base of the flanks at the level of the fillet radius with the root.

A need of this type is naturally not satisfied by connections with self-locking threads the threadings of which satisfy both the conventional function of threadings as well as the function of axial abutment. Connections of that type necessitate very high torques, while being sensitive to galling and having delicate seals. In fact, machining threads, the stabbing flank and the load flank of which simultaneously interfere with the complementary flanks of the threading which is itself complementary, creates a friction over the whole length of the threading which is actually engaged. Furthermore, the manufacturing tolerances of the threadings mean that a very accurate positioning of the male element in the female element cannot be guaranteed. There is an uncertainty in the relative axial positioning of the male element and the female element, which uncertainty can lead to a failure of the seal of the sealing surfaces. Furthermore, connections of that type do not provide a satisfactory high degree of sealing by the threadings themselves, in particular because of the clearance which is necessary between the crest and roots of the threads, resulting in a radial space in which a fluid can advance.

As illustrated in FIG. 1, the male threaded element 2 is disposed at the end of a first tubular component. The first tubular component also comprises a body 6 with a substantially constant internal diameter and external diameter over its length. The body 6 and the male threaded element 2 are in one piece (by rolling, thickening or welding). The male threaded element 2 has a bore 4. The bore 4 may be common with the body 6. The bore 4 may be as rolled, optionally coated. In general, the bore 4 is not machined. The body 6 of the first tubular component is provided with an outer as-rolled surface. The male threaded element 2 is machined, at least for the most part, between the bore 4 and the outer surface of the body 6. The first and second tubular components are ready for use, in that their definitive external diameter remains substantially unchanged during use thereof. A slight increase in the external diameter may occur in the region of the bearing surfaces or threads due to interference of the male element/female element. This increase remains minor, with a maximum of the order of 0.2 to 0.3 mm.

The male threaded element 2 comprises an outer male threading 8 disposed in the vicinity of the body 6. The outer male threading 8 is provided with one or two threads. The description below is applicable both to a mono-thread version and to a multi-thread version, in particular a dual-thread version known as a "double start" version. The outer male threading 8 follows a tapered generatrix preferably with a gradient in the range 5% to 20%. The preferred range is 8.33% to 20%. The outer male threading 8 is provided with a dovetail thread. The thread has a maximum width close to the thread crest and a minimum width distant from the thread crest. The minimum width is generally in the vicinity of the thread valley. The thread may have a trapezoidal profile with the major base formed by the thread crest, with the exception of the fillet radii. The trapezoid may be isosceles. The outer male threading 8 comprises perfect threads and imperfect or vanishing threads close to the body 6. The vanishing threads reduce the bulk of the connection. The outer male threading 8 has an increasing tooth width on moving towards the body 6 and a decreasing valley width on moving towards the body 6. The outer male threading 8 has a large diameter end in the vicinity of the body 6 and a small diameter end opposite to it.

The male threaded element 2 comprises an inner male threading 10. The second male threading 10 is said to be inner in that it has a smaller diameter than the diameter of the first male threading 8. The inner male threading 10 is thus located towards the inner of the connection. The inner male threading 10 in this case has a length along the axis of the connection which is greater than the length of the outer male threading 8. In a preferred embodiment, the inner male threading 10 has the same geometry as the outer male threading 8 in terms of the taper, thread height, load flank angle, stabbing flank angle and pitch variability. The inner male threading 10 has perfect threads in its small diameter region and imperfect threads in its large diameter region closest to the outer male threading 8. The inner male threading 10 may have the same generatrix as the outer male threading 8. The male threading 10 may have the same generatrix angle as the outer male threading 8.

Between the outer male threading 8 and the inner male threading 10, the male threaded element 2 comprises a first male outer peripheral surface 14, see FIG. 3. The first male outer surface 14 is annular. In general, the first male outer surface 14 is axially disposed in a region in which the thickness of the male threaded element 2 is greater than or equal to 50% of its maximum thickness taken in the vicinity of the body 6.

Moving from the outer male threading 8 to the inner male threading 10, the first male outer peripheral surface 14 has a first ramp 14*a* extending from the valley with the smallest diameter of the outer male threading 8. The first ramp 14*a* forms the attack of the outer male threading 8 from which the first tooth commences. The first ramp 14*a* may have a gradient in the range 20° to 50°. The first ramp 14*a*, viewed in the radial direction, has a dimension of the order of 0.1 to 3.0 mm.

The first outer peripheral surface 14 comprises a first cylindrical portion 14*b*. The first cylindrical portion 14*b* here is in the extension of the first ramp 14*a* opposite to the outer male threading 8 on the side of the small diameter of the first ramp 14*a*. The first outer peripheral surface 14 comprises a second ramp 14*c*. The second ramp 14*c* is tapered. The second ramp 14*c* has a gradient in the range 10° to 30°. The second ramp 14*c* is connected to the first cylindrical portion 14*b* on the side opposite to the first ramp 14*a*. The first ramp 14*a*, the first cylindrical portion 14*b* and the second ramp 14*c* provide an annular space 16 which can collect surplus lubricant if necessary.

The first outer peripheral surface 14 comprises a male sealing surface 12. The male sealing surface 12 forms the first sealing surface of the male threaded element 2. The male sealing surface 12 is disposed in a region of the male threaded element 2 with a radial thickness in the range 50% to 80% of the maximum thickness. The first male sealing surface 12 comprises a cylindrical portion 12*a* and a convex portion 12*b*. The maximum thickness is measured at the junction of the cylindrical portion 12*a* and the convex portion 12*b*, between said junction and the bore 4. The cylindrical portion 12*a* is adjacent to the second ramp 14*c*. The convex portion 12*b* is distant from the second ramp 14*c*. The male sealing surface 12 is measured between the cylindrical portion 12*a* and the convex portion 12*b*.

The first male sealing surface 12 is connected to the second ramp 14*c* on the side opposite to the first cylindrical surface 14*b*. The first male sealing surface 12 connects to the large diameter end of the second ramp 14*c*. The convex portion 12*b* in this case has a domed shape, for example with a radius of curvature in the range 30 to 80 mm. The first outer peripheral surface 14 comprises a second cylindrical portion 14*d* disposed between the first male sealing surface 12 and the inner male threading 10. The convex portion 12*b* is connected to the second cylindrical portion 14*d*. The second cylindrical portion 14*d* extends axially over a distance of the order of 3 to 25 mm. The second cylindrical portion 14*d* has a diameter equal to the maximum diameter of the teeth of the inner male threading 10. In other words, the height of the large diameter teeth of the inner male threading 10 are limited by said diameter. At least the last thread is imperfect. The first male sealing surface 12 is provided in order to come into interference with the female threaded element 3. A large diameter region of the second ramp 14*c* may also interfere with the female threaded element 3.

Beyond the end of the inner male threading 10 on the side opposite to the outer male threading 8, the male threaded element 2 comprises a second outer peripheral surface 26 and a male axial abutment surface 20 forming the terminal portion of said male threaded element. The second outer peripheral surface 26 forms the outer envelope of a lip 28 delimited on the opposite side by the bore 4. The second outer peripheral surface 26 comprises a cylindrical portion 26*a* close to the smallest diameter valley of the inner male threading 10. The cylindrical portion 26*a* has a diameter which is slightly smaller than the diameter of the smallest diameter valley of the inner male threading 10.

The second outer peripheral surface 26 comprises a second male sealing surface 22, in this case tapered in shape, see FIG. 4. The gradient may be in the range 3° to 10°. The second male sealing surface 22 extends from the cylindrical portion 26*a* in the direction of the male axial abutment surface 20. The axial dimension of the second male sealing surface 22 along the axis of the connection is in the range 10 to 35 mm. The second outer peripheral surface 26 of the male threaded element comprises a second tapered surface 26b and a convex surface 26c disposed between the second male sealing surface 22 and the male axial abutment surface 20. The gradient of the second tapered surface 26b is larger than the gradient of the second male sealing surface 22. The second tapered surface 26b has a gradient in the range 10° to 50°. The gradient of the convex surface 26c is greater than or equal to the gradient of the second tapered surface 26b. The term "gradient" as used here means the inclination with respect to the axis of the male threaded element. The convex surface 26c here has a radius of curvature in the range 0.25 to 1.5 mm, preferably in the range 0.5 to 1.0 mm. The second sealing surface 22 is provided so as to produce an interference fit with the female threaded element 3.

The male axial abutment surface 20 forming the nose of the male threaded element has an angle in the range 0° to 30°, limits included, with respect to a radial plane. Preferably, said angle is in the range 10° to 30°. In the example of FIG. 1, said angle is equal to 15°. The male axial abutment surface 20 is connected to the bore 4 of the male threaded element 2.

The female threaded element 3 comprises an outer female threading 9 engaged with the outer male threading 8 in the coupled state. The outer female threading 9 may extend to the immediate vicinity of the terminal surface 3a (radial in this case) of the female threaded element 3. The terminal surface 3a is free in the made up state. The female threaded element 3 also comprises an inner female threading 11 cooperating when engaged with the inner male threading 10 in the coupled state, in particular in the position illustrated in FIG. 1. The threads of the outer female threading 9 are perfect. The threads of the inner female threading 11 are perfect. Between the outer female threading 9 and the inner female threading 11, the female threaded element 3 comprises an inner peripheral surface 15.

The inner peripheral surface 15 is annular. The inner peripheral surface 15 comprises a first cylindrical portion 15a extending the outer female threading 9 in the direction opposite to the terminal surface 3a. The first cylindrical portion 15a is radially disposed facing, at least partially, the first cylindrical portion 14b of the outer peripheral surface 14 of the male threaded element 2. The first cylindrical portion 15a of the female threaded element and the first cylindrical portion 14b of the male threaded element are separated by a radial distance, avoiding interference, allowing for manufacturing tolerances, and forming said space 16. The first cylindrical portion 15a of the female threaded element 3 extends axially over a distance which is greater than the first cylindrical portion 14b of the male threaded element 2. The first cylindrical portion 15a of the female threaded element 3 also extends in the extension of the smallest diameter thread crest of the female threading 9. The first cylindrical portion 15a may interfere with or come to within a very small distance from the smallest diameter valley of the outer male threading 8. The first cylindrical portion 15a also radially faces the ramp 14a disposed between said smallest diameter valley of the outer male threading 8 and the first cylindrical portion 14b.

The inner peripheral surface 15 of the female threaded element 3, see FIG. 3, comprises a first female sealing surface 13 disposed at a distance from the outer female threading 9 and from the inner female threading 11. The first female sealing surface 13 is located in the extension of the first cylindrical portion 15a. The first female sealing surface 13 has a central tapered portion 13a. The cone angle may be in the range 1° to 20°. The first female sealing surface 13 comprises a first domed surface 13b disposed between the first cylindrical portion 15a and the central portion 13a. The first domed surface 13b has a radius in the range 1 to 30 mm.

The first female sealing surface 13 comprises a second domed surface 13c disposed between the central portion 13a and a second cylindrical portion 15b. The second domed surface 13c has a radius in the range 1 to 15 mm. The central portion 13a has a minimum diameter opposite the outer female threading 9. In the coupled state of the connection as illustrated in FIG. 1, the first female sealing surface 13 is in strong diametrical interference with the first male sealing surface 12 with a rounded convex shape. The seal is a torus on cone seal. The first female sealing surface 13 is disposed in a region of the female threaded element 3 with a radial thickness in the range 20% to 50% of the maximum thickness of the male threaded element 2. The maximum thickness is measured at the junction point between the central portion 13a and the second domed surface 13c, between said junction and the outer surface 7. The radial thickness of the first female sealing surface 13 is measured at the junction point between the central portion 13a and the second domed surface 13c.

The inner peripheral surface 15 of the female threaded element 3 comprises a second cylindrical portion 15b. The second cylindrical portion 15b is disposed facing the second cylindrical portion 14d of the outer peripheral surface 14 of the male threaded element 2. The second cylindrical portion 15b extends over a length in the range 2 to 25 mm. A gap 17 is formed between the second cylindrical portion 14d and the second cylindrical portion 15b. The second cylindrical portion 15b is connected to the valley with the largest diameter of the inner female threading 11.

The female sealing surface 23 forms the second sealing surface of the female threaded element 3. The female sealing surface 23 and the male sealing surface 22 form a cone on cone seal.

At the other end of the inner female threading 11, see FIG. 4, the female threaded element 3 comprises a second inner peripheral surface 27 provided with a female sealing surface 23. The second inner peripheral surface 27 comprises a cylindrical portion 27a with a slightly larger diameter than the diameter of the corresponding first cylindrical portion 26a of the second outer peripheral surface 26 of the male threaded element 2. Said cylindrical portion 27a is disposed in the extension of the crest with the smallest diameter of the last tooth of the inner female threading 11. The second female sealing surface 23 extends said cylindrical portion 27a opposite to the inner female threading 11. Beyond the second female sealing surface 23, the second inner peripheral surface 27 comprises a rounded hollow 27b. The hollow 27b has a diameter which is greater than the diameter of the convex portion 26c of the second outer peripheral surface 26 of the male threaded element 2 in the coupled state. In the uncoupled state, the hollow 27b may have a diameter which is larger than the diameter of the convex portion 26c.

The second female sealing surface 23 has a first tapered portion 23a, a second tapered portion 23b and a third tapered portion 23c. Here, the first tapered portion has a half-angle in the range 5° to 25°. The first tapered portion 23a occupies more than 15% of the length of the second female sealing surface 23. The first tapered portion 23a is connected to the cylindrical portion 27a. The second tapered portion 23b is disposed between the first tapered portion 23a and the third tapered portion 23c. The second tapered portion 23b has a gradient in the range 3° to 15°. The second tapered portion 23b has a gradient which is lower than the gradient of the first tapered portion 23a. The third tapered portion 23c is connected to the hollow 27b. The third tapered portion 23c has a gradient in the range 15° to 35°. The third tapered portion 23c has a gradient which is larger than the gradient of the second tapered portion 23b. The third tapered portion 23c produces an interference fit with the second tapered surface 26b in the coupled state.

The female threaded element 3 comprises a female axial abutment surface 21 disposed between the second inner peripheral surface 27 and the bore 5 of said female threaded element 3. More precisely, the female axial abutment surface 21 is disposed between the hollow 27b and the bore 5. The orientation of the female axial abutment surface 21 is substantially similar, in this case identical, to the orientation of the male axial abutment surface 20.

In the coupled state illustrated in FIGS. 1 and 5, the outer female threading 9 and the outer male threading 8 are engaged. The inner female threading 11 and the inner male threading 10 are engaged. The first male 12 and female 13 sealing surfaces radially interfere, providing a seal at least to liquid or even to gas if necessary. The second sealing surfaces, male 22 and female 23, are in radial interference providing a seal at least to liquid, or even to gas. The male 20 and female 21 axial abutment surfaces bear one against the other. Bearing of the axial abutments ensures precise and reproducible positioning of the male threaded element 2 with respect to the female threaded element 3. In the embodiment shown, the male axial abutment surface 20 is annular and the female axial abutment surface 21 is annular. The male and female axial abutment surfaces are unique.

The hollow 27b of the second inner peripheral surface 27 is distant from the male threaded element 2. More precisely, the hollow 27b is distant from the convex surface 26c of the second outer peripheral surface 26 of the male threaded element 2. The annular space 18 formed between the hollow 27b and the convex surface 26c means that any excess lubricant can be collected. The annular space 18 can be used to ensure that the contact of the abutment is in fact made on the male 20 and female 21 abutment surfaces. The annular space 18 can be used to avoid abutment at the junction between the convex surface 26c and the male axial abutment surface 20. The annular space 18 can be used to avoid abutment at the junction between the third tapered portion 23c and the female axial abutment surface 21 which is likely to occur in the absence of the rounded hollow 27b. The second tapered surface 26b is in contact or interferes slightly with the third tapered portion 23c of the second female sealing surface 23.

In FIG. 4, the connection is shown in a state during screwing, before the connected position illustrated in FIG. 5. The male 20 and female 21 axial abutment surfaces are separated by a few millimeters. FIG. 4 shows the connection in a theoretical situation in which the reaction of the two sealing surfaces 22 and 23 one against the other has not been taken into account. The interference represented between the second sealing surfaces 22 and 23 is theoretical and greater than the actual interference. This is illustrated by the fact that in FIG. 4, the bore 4 has a diameter which is slightly larger than the diameter of the bore 5. In contrast, in FIG. 5, which represents an actual coupled state, the diameter of the bore 4 is less than the diameter of the bore 5 by a few millimeters. The reaction of the two sealing surfaces 22 and 23 one against the other causes the radially inward displacement of the lip 28. In effect, the lip 28 has a radial thickness which is substantially less than the radial thickness of the threaded element 3 in the region of the second female sealing surface 23. The lip 28 can thus deform more easily than the corresponding portion of the female threaded element shortly before the end of screwing. The two sealing surfaces, 22 and 23, come into contact and the lip 28 is deformed slightly inwardly in the elastic deformation region. At the end of screwing, the male 20 and female 21 axial abutments come into abutting contact and because of their gradient, tend to stabilize the slight elastic deformation radially towards the interior of the lip 28.

FIG. 2 shows the outer male 8 and female 9 threadings in more detail. The inner male 10 and female 11 threadings may adopt the same shape and the same characteristics. The outer male threading 8 has a tapered generatrix with a gradient in the range 5% to 20%, for example equal to 15%. The outer male threading 8 comprises teeth 8a and valleys 8b. The pitch of the outer male threading 8 may be in the range 5 to 20 mm, for example equal to 8.466 mm. The outer male threading 8 has a stabbing flank 8c and load flank 8d. The stabbing flank 8c has an inclination in the range +1° to +15°, for example in the range +5° to +8°. The load flank 8d has an inclination in the range −1° to 15°, for example in the range −5° to −8° with respect to a radial plane. Thus, the width of a tooth 8a is higher in a zone close to its crest than the width in a zone close to the valley 8b. The outer male threading 8 is a dovetail threading.

The outer female threading 9 is a dovetail threading. The outer female threading 9 comprises teeth 9a and valleys 9b with stabbing flanks 9c and load flanks 9d. The teeth 9a are wider in the proximity of their crest than in the proximity of the valley 9b. The crest of the teeth 9a is substantially parallel to the axis of the connection. The root of the valleys 9b is substantially parallel to the axis of the connection. The crest of the teeth 8a is substantially parallel to the axis of the connection. The root of the valleys 8b is substantially parallel to the axis of the connection. The stabbing flank 9c has an inclination in the range +1° to +15°, for example in the range +5 to 8°. The load flank 9d has an inclination in the range −1° to −15°, for example in the range −5° to −8° with respect to a radial plane.

In the embodiment shown, the teeth 9a and valleys 8b radially interfere in the coupled state illustrated in FIG. 2. Said radial interference is sufficiently small to avoid plastic deformation of the threads. The teeth 8a and the valleys 9b are separated. The distance between the teeth 8a and the valleys 9b, denoted the radial gap of the threads, is in the range 0.050 to 0.500 mm, for example in the range 0.050 to 0.400 mm. In the coupled state, the stabbing flanks 8c and 9c respectively of the male 8 and female 9 outer threadings are separated. The distance TAG separating them, denoted the axial thread gap, is in the range 0.002 to 1.000 mm, for example in the range 0.002 to 0.400 mm. In the coupled state, the load flanks 8d and 9d respectively of the outer male 8 and outer female 9 threadings bear against each other, in particular due to the reaction of the abutment surfaces 20 and 21 against each other. As indicated above, the male 10 and female 11 inner threadings may adopt an identical shape. Preferably, the inner threadings 10 and 11 have stabbing flanks and load flanks which are at most inclined at the inclination of the stabbing flanks and load flanks of the outer threadings 8 and 9.

In a variation, the stabbing flanks and load flanks of the inner threadings 10 and 11 may be orientated radially, which can increase the tensile behaviour.

In another variation, the stabbing flanks of the inner threadings 10 and 11 are radial, while the load flanks of the inner threadings 10 and 11 have substantially the same inclination as the load flanks of the outer threadings 8 and 9. The inner threadings 10 and 11 have a pitch equal to the pitch of the outer threadings 8 and 9.

The outer threadings 8 and 9 have a continuously variable width. The variation in the width of the threadings per turn may be in the range 0.1 to 1 mm.

The choice of the gradient of the generatrix and the angles of the stabbing flanks and the load flanks of the inner and outer threadings determines the number of turns which have to be completed to obtain the coupled state. Clearly, the stabbing flanks and the load flanks have an orientation such that during the start of screwing, the widest portion of a tooth of a male or female threading passes into the narrowest portion of the corresponding valley of the female or male threading respectively.

Figure 8:
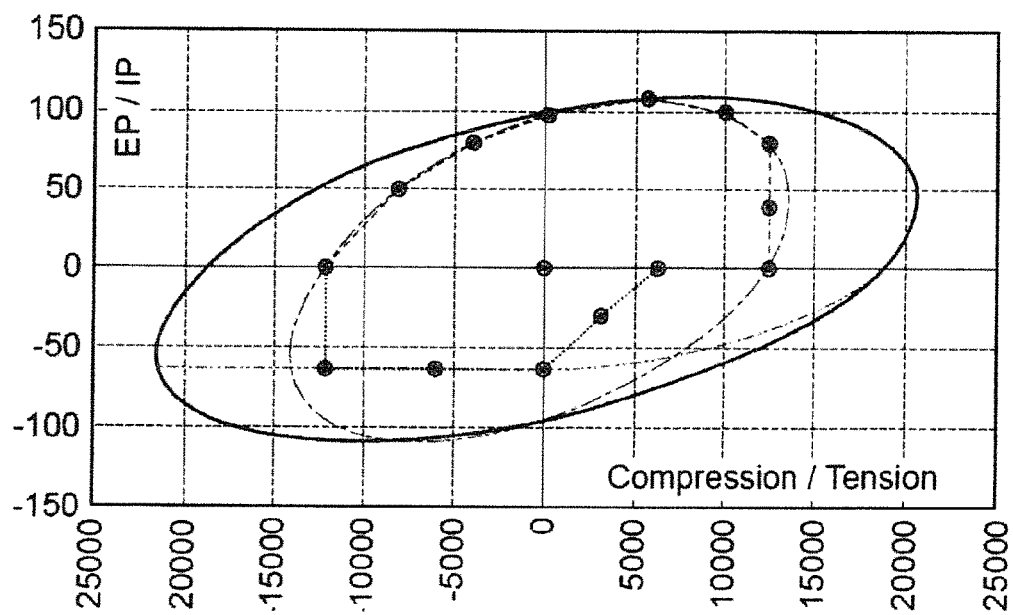
FIG. 8 is a load/pressure diagram.

FIG. 6 illustrates the change in the contact surfaces of the inner seal formed by the second sealing surfaces and the central seal formed by the first sealing surfaces. A reference connection is used here by way of comparison, the principal difference with the connection of the invention being the number of threaded portions. In fact, the reference connection has just one stage, and the position of the sealing surface which is resistant to external pressure is located between the 2 threaded portions of the present invention, or on the outside close to the outer surface of the body 6 on the reference connection. The axial abutment is located close to the bore 5 in the present invention, and on the outside close to the outer surface of the body 6 on the reference connection. The contact surface test is carried out in steps during which the pressure and axial force are varied. The first step corresponds to the connected state with equal pressure between the interior and exterior of the connection and a zero tension/compressive load. The second step conserves the equal pressures and is carried out at 100% of the nominal tension—Elastic Limit of the Connection, or LEC—i.e. 54865 kN (12346 kilopounds). The third step applies 100% of the nominal tensile load and 50% of the internal pressure with respect to a nominal pressure of 565370 kPa (82 kpsi). The fourth step applies 100% of the nominal tensile load and 100% of the nominal internal pressure. The fifth step applies 80% of the nominal tensile load and the internal pressure is at 689476 kPa (100 kpsi). The sixth step applies the maximum internal pressure of 751528 kPa (109 kpsi) and the tension resulting from this pressure, the ends being blocked, i.e. 24757 kN (5571 kilopounds). The seventh step corresponds to an internal pressure of 682581 kPa (99 kpsi) without a tensile/compressive load. The eighth step applies 33.3% of the nominal compressive load and the internal pressure is at 100% of the nominal value. The ninth step applies 66.7% of the nominal compressive load and the internal pressure is at 358527 kPa (52 kpsi). The tenth step applies 100% of the nominal compressive load, i.e. −54865 kN (−12346 kilopounds) and an internal pressure which is taken to 0. The eleventh step applies no load. The twelfth step applies a compression of 100% of the nominal value at zero pressure. The thirteenth step applies a compression of 100% of the nominal value and zero pressure. The fourteenth step applies a compression of 50% of the nominal value and an external pressure of 427475 kPa (62 kpsi). The fifteenth step applies a purely external pressure of −427475 kPa (−62 kpsi) in the absence of a compressive/tensile load. The sixteenth step applies a tensile load at 25% of the nominal value and an external pressure of 199948 kPa (29 kpsi). The seventeenth step applies a tensile load of 50% of the nominal value in the absence of internal pressure or external pressure. The eighteenth step applies neither a pressure load nor a tensile/compressive load. The nineteenth step applies a tension of 100% of the nominal value in the absence of a pressure differential. The twentieth step applies a tensile load of 100% of the nominal value and an internal pressure of 50% of the nominal value. The twenty-first step applies a tensile load of 100% of the nominal value and an internal pressure of 100% of the nominal value. The twenty-second step applies a tensile load of 80% of the nominal value and an internal pressure of 100 psi. The twenty-third step applies a maximum internal pressure and the tension resulting from this pressure, the ends being blocked off. The twenty-fourth step applies an internal pressure of 751528 kPa (109 kpsi) and a tensile load of 5571 kpsi. The twenty-fifth step applies a compressive load of 33.3% of the nominal value and an internal pressure of 100% of the nominal value. The twenty-sixth step applies a compressive load of 66.7% of the nominal value and an internal pressure of 358527 kPa (52 kpsi). The twenty-seventh step applies a compressive load of 100% of the nominal value in the absence of a differential pressure. The twenty-eighth and final step corresponds to an absence of a pressure differential and tensile or compressive load. These steps are illustrated in FIG. 8, representing the load points. These points are cycled several times, following a loading cycle. The same point is passed through several times. Thus, there are more steps in FIGS. 6 and 7 than loading points in FIG. 8.

The respective diagrams corresponding to the seals of the connection of the invention and the connection used for comparison show a considerable increase in the performances in the majority of the situations, in particular in the situations in which the comparative connection offered limited performance. By way of example, in step 1, the contact surfaces of the inner seal are of the order of four times better than the surfaces of the comparison connection. The central seal provides surfaces in contact of the order of 3 times larger than those provided by the comparison connection. Under pure tension, corresponding to the second step, the inner seal of the connection of the invention has a contact surface which is three times larger than that of the reference connection. The central seal provides a contact surface which is of the order of six times larger than that provided by the outer seal of the connection of the invention. In the fourth and fifth step, the contact surfaces of the inner seal are comparable to those of the reference connection and in contrast, the contact surfaces of the central seal of the connection of the invention are three to four times larger than those offered by the outer seal of the reference connection. This is substantially the same for the steps applying purely internal pressure. In other words, the behaviour of the connection of the invention subjected to a high internal pressure, in the absence of a compressive or tensile load, is improved by the central seal of the invention as it protects the inner bearing surface from the effect of the external pressure. The behaviour of the connection of the invention under high internal pressure and under compressive load is considerably improved.

In the steps applying compression, in particular steps 8, 9, 10, 12, 13, 14, 25 and 26, the inner seal involves an improved contact energy by a factor of 1.4 to 6, i.e. an increase of 40% to 500%. Finally, the minimum contact energy provided by the inner seal of the connection of the invention is multiplied by more than three compared with that of the reference connection. The contact energy of the central seal of the connection of the invention stays above 400 Nmm$^{-1}$ in 2D projection, while the contact energy of the outer seal of the reference connection may have very low values under tensile load or in the absence of load.

Figure 7:
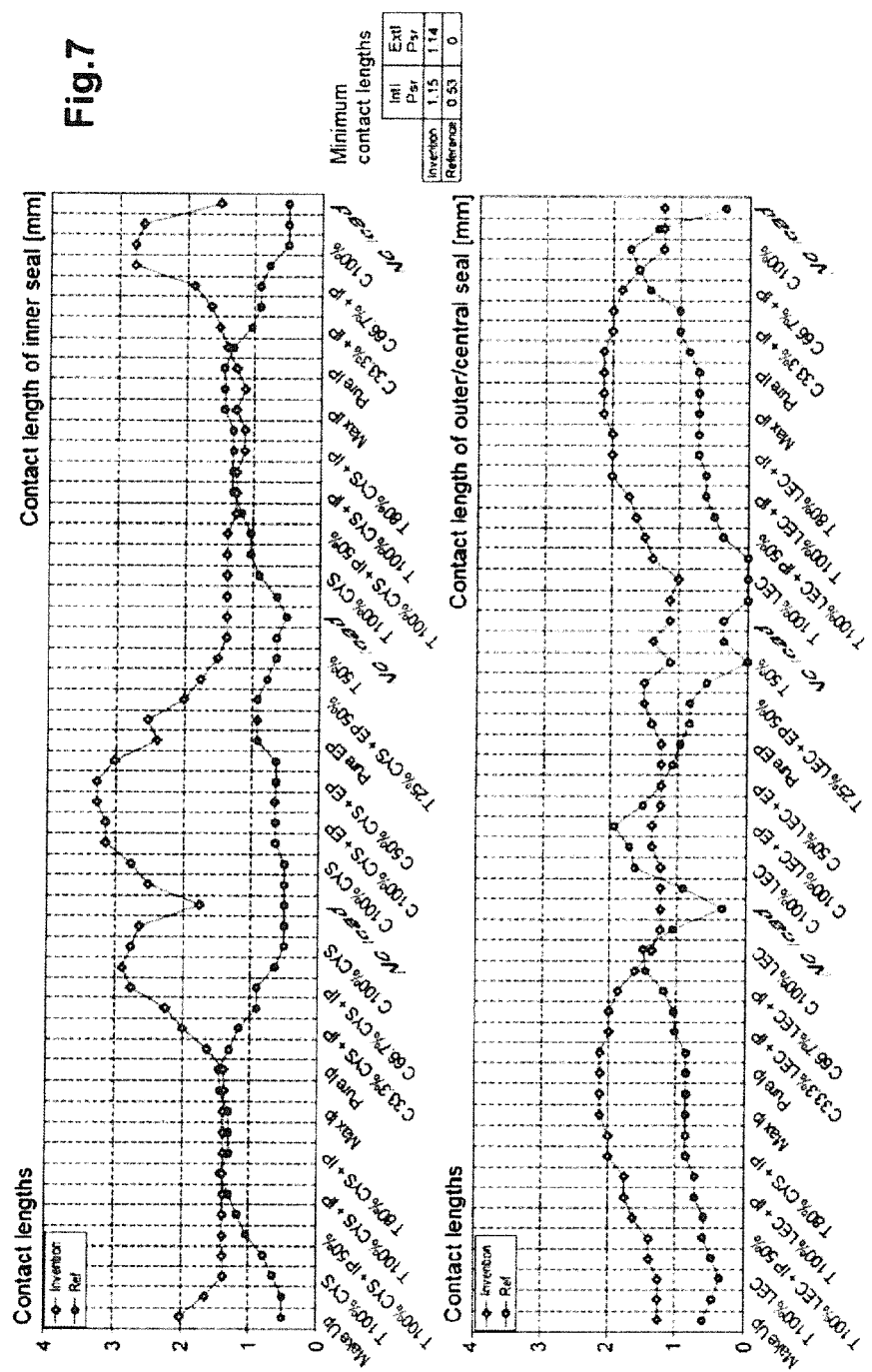
FIG. 7 is a diagram corresponding to that of FIG. 6 showing, up the ordinate, the contact lengths of the first and second sealing surfaces.

In FIG. 7, the diagrams constructed using the same model and the same steps demonstrate the contact length in millimeters of the inner seal of the connection of the invention and the reference connection at the top, and at the bottom, of the central seal of the connection of the invention and the outer seal of the reference connection. The sealing contact length of the inner seal of the connection of the invention is higher, often much higher than that of the reference connection in the majority of the steps, in particular in purely tensile situations, with an internal pressure in the range 0 to 50% of the nominal value, in compression with or without internal pressure, in compression with or without external pressure, under purely external pressure in the absence of tension/compression, under moderate tension with an external pressure in the range 0 to 50% of the nominal value. The effect obtained is particularly remarkable under pure compression with a sealing contact length increased by a factor of 4 or 5. The performance is also remarkable under 100% compression and 100% external pressure with a contact length increased by a factor of more than 4. The minimum value of the contact length of the internal seal is increased by more than 100% with respect to the reference connection.

The contact length is also greatly increased compared with the reference connection for the other seal, central in accordance with the invention and outer for the reference connection, with a minimum length irrespective of the test situation substantially equivalent to that of the inner seal, while it approaches 0 for that of the reference connection. The performances of the central seal are thus improved by more than 100% for tensile situations at 100% of nominal, tension with internal pressure, pure internal pressure, the absence of load, 100% nominal tension and internal pressure in the range 0 to 100%. The performances are substantially improved for compressive situations at one third and two thirds of nominal and under internal pressure.

Compression has an effect which is capable of wrecking the sealing surface. During the tests, a leak was detected, especially under tension.

As an example, the screwing torque of the connection of the invention was equal to 90000 Nm for a maximum diameter of 365.27 mm. The central seal was observed to be particularly stable to tensile loads, irrespective of the direction of the pressure. The outer seal was highly stable under compression, irrespective of the direction of the pressure and without internal pressure irrespective of the tensile/compressive load.

The seals represented are of the torus on cone type. Torus on torus type seals constitute a variation. Cone on cone seals constitute a variation.

Thus, a dual-threading connection, an inter-threading sealing surface, an inner sealing surface, an inner axial abutment with an outer dovetail thread type threading with a variable width and a stabbing flank which is contact-free in the coupled state and a thickness selected for the female threaded element at right angles to the first female sealing surface in the range 20% to 50% of the nominal thickness of the male threaded element has been shown to provide extremely good performances as regards the behaviour under internal pressure/external pressure cycles and tension/compression cycles.

The invention claimed is:

1. A threaded tubular connection comprising:
   a male threaded element disposed at an end of a first tubular component and a female threaded element disposed at an end of a second tubular component;
   the male threaded element comprising two male threadings, an outer and an inner, a first outer peripheral surface disposed between the male threadings, a first male sealing surface on the outer peripheral surface, a second outer peripheral surface, a male axial abutment surface disposed at an end of the male threaded element, and a second male sealing surface provided on the second outer peripheral surface of the male threaded element between the inner threading and the male axial abutment surface;
   the female threaded element comprising two female threadings, an outer and an inner, an inner peripheral surface disposed between the female threadings, at least one first female sealing surface on the inner peripheral surface, a female axial abutment surface, and a second female sealing surface provided between the female axial abutment surface and the inner female threading;
   the threads of the outer male and female threadings being engaged in a coupled state, the threads of the inner male and female threadings being engaged in the coupled state;
   the male axial abutment surface and the female axial abutment surface being abutted in the coupled state, the first male sealing surface and the first female sealing surface being in sealing contact in the coupled state, the second male sealing surface and the second female sealing surface being in sealing contact in the coupled state;
   wherein the outer male threading comprises a dovetail thread with an increasing width and the corresponding outer female threading comprises a dovetail thread with an increasing width, the thread of the outer male threading comprising a load flank and a stabbing flank, the stabbing flank being contact-free in the coupled state, the thread of the inner male threading comprising a load flank and a stabbing flank, the stabbing flank being contact-free in the coupled state; and
   wherein thickness of the female threaded element measured in a radial plane intersecting with the first female sealing surface is in a range of 20% to 50% of nominal thickness of the male threaded element.

2. The connection according to claim 1, wherein the inner male threading comprises a thread with an increasing width and the corresponding inner female threading comprises a thread with an increasing width.

3. The connection according to claim 2, wherein the inner male threading comprises a dovetail thread with an increasing width and the corresponding inner female threading comprises a dovetail thread with an increasing width.

4. The connection according to claim 1, comprising a single male axial abutment surface and a single female axial abutment surface disposed in vicinity of a bore of the female threaded element.

5. The connection according to claim 1, wherein in the coupled state, at least one of the outer male threading and the inner male threading radially interferes with the corresponding female threading at a thread root and has a radial clearance at a thread crest, or radially interferes at the thread crest with the corresponding female threading and has a radial clearance at the thread root, the radial clearance being in a range of 0.05 to 0.50 mm.

6. The connection according to claim 1, wherein a stabbing flank which is contact-free in the coupled state has an axial clearance in a range of 0.002 to 1.000 mm, with a corresponding stabbing flank.

7. The connection according to claim 1, wherein the outer male threading comprises a vanishing thread.

8. The connection according to claim 1, wherein the outer male threading comprises a load flank with an inclination in a range of −1 to −15°, and a stabbing flank with an inclination in a range of +1 to +15° with respect to a radial plane.

9. The connection according to claim 1, wherein the male axial abutment surface is at an angle in a range of 0 to 30° with respect to a radial plane.

10. The connection according to claim 1, wherein a regular section of the first tubular component has an external diameter of more than 230 mm.

11. The connection according to claim 1, wherein a regular section of the female threaded element has an external diameter of less than 110%, of the external diameter of the second tubular component.

12. The connection according to claim 1, wherein the threadings have a taper in a range of 5% to 20%.

13. The connection according to claim 1, wherein the male threaded element comprises a lip with a thickness in a range of 20% to 35% of thickness of the regular section of the first tubular component, the lip being disposed between the inner threading and the male axial abutment surface.

14. The connection according to claim 1, having an efficiency of more than 80%, the connection having an external diameter in a range of 101.5% to 105% of nominal diameter of the tube.

15. The connection according to claim 1, having an efficiency in a range 60% to 68%, the connection having an external diameter equal to nominal diameter of the tube, allowing for tolerances.

16. The connection according to claim 1, wherein makeup torque placing the connection in the coupled state and ready for use is less than 94907 Nm.

17. A casing connection according to claim 1.

* * * * *

UNITED STATES PATENT AND TRADEMARK OFFICE
CERTIFICATE OF CORRECTION

PATENT NO. : 10,407,997 B2
APPLICATION NO. : 15/525185
DATED : September 10, 2019
INVENTOR(S) : Pierre Martin It is certified that error appears in the above-identified patent and that said Letters Patent is hereby corrected as shown below:

On the Title Page

(71) Applicants, change "Nippon Steel & Sumitomo Metal Corporation" to --Nippon Steel Corporation--.

Signed and Sealed this
Seventeenth Day of March, 2020

Andrei Iancu
*Director of the United States Patent and Trademark Office*